United States Patent
Stadler et al.

(10) Patent No.: US 12,490,753 B2
(45) Date of Patent: *Dec. 9, 2025

(54) VEGAN ALTERNATIVE TO CHEESE (II)

(71) Applicant: DMK Deutsches Milchkontor GmbH, Zeven (DE)

(72) Inventors: Christian Stadler, Zeven (DE); Jan Pommer, Rhauderfehn (DE)

(73) Assignee: DMK Deutsches Milchkontor GmbH, Zeven (DE)

(*) Notice: Subject to any disclaimer, the term of this patent is extended or adjusted under 35 U.S.C. 154(b) by 294 days.

This patent is subject to a terminal disclaimer.

(21) Appl. No.: 18/207,476

(22) Filed: Jun. 8, 2023

(65) Prior Publication Data

US 2023/0397625 A1    Dec. 14, 2023

(51) Int. Cl.
*A23C 20/02* (2025.01)
*A23J 3/14* (2006.01)

(52) U.S. Cl.
CPC .............. *A23C 20/02* (2013.01); *A23J 3/14* (2013.01)

(58) Field of Classification Search
CPC ........... A23J 3/14; A23C 20/02; A23C 20/025
See application file for complete search history.

(56) References Cited

FOREIGN PATENT DOCUMENTS

| | | |
|---|---|---|
| EP | 3141130 A1 | 3/2017 |
| EP | 3213638 A1 | 9/2017 |
| EP | 4005400 A1 | 6/2022 |
| WO | 2020089383 A1 | 5/2020 |
| WO | 202205888 A1 | 1/2022 |

OTHER PUBLICATIONS

European Action for EP22177815, mailed Dec. 7, 2022, 13 pages.
Food Innovations, "Emfix K 02", Downloaded from Internet Mar. 27, 2023, 1 page.
Food Innovations, "Emes EOA 30 (F 7212)", Downloaded from Internet Mar. 27, 2023, 1 page.
Food Innovations, "Emflo 991", Downloaded from Internet Mar. 27, 2023, 1 page.
Mintel, "Cheddar style cheese alternative with caramelised red onion", Downloaded from Internet Mar. 27, 2023, 4 pages.
USDA, "Nuts, cashew nuts, raw", Downloaded from Internet Nov. 23, 2022, 2 pages.

*Primary Examiner* — Kelly J Bekker
(74) *Attorney, Agent, or Firm* — Timothy H. Van Dyke; Wolter Van Dyke Davis, PLLC

(57) ABSTRACT

There is proposed a vegan food product, in particular a vegan alternative to cheese, its method of production, and a comestible product comprising such a vegan food product.

6 Claims, No Drawings

VEGAN ALTERNATIVE TO CHEESE (II)

FIELD OF THE INVENTION

The invention is in the field of food technology and relates to a vegan food product, in particular a vegan alternative to cheese, and to its methods of production.

TECHNOLOGICAL BACKGROUND

In recent years, there has been a continuous increase in the awareness of a healthy diet among consumers. For instance, a healthy diet involves providing the body with all the important nutrients without excessive consumption of fats, salt and sugar.

In addition to a healthy and balanced diet, there is also an increasing focus in society on the issue of a predominant plant-based diet. Making a transition to a vegetarian lifestyle has accordingly a positive effect on the climate. By avoiding meat as part of the diet, it is possible to avoid releasing a great quantity of $CO_2$.

The demand for vegan foods therefore represents a highly attractive and fast-growing market for food manufacturers. In addition, especially vegan consumers place great importance on the natural production of foods and therefore preferentially use organic foods.

However, with regard to vegan alternatives to cheese, what is on offer as a whole is limited and in some cases unconvincing in respect of sensory assessment, declaration, nutritional value, organic quality and functionality.

WO2020089383 A1 provides a vegan cheese analogue which is produced on the basis of dietary fibres, calcium, lipids and plant protein.

Document EP3213638 A1 discloses a cheese analogue which comprises water, a root or tuber starch, native potato protein and a fat component.

In general, consumers state that the products currently available on the market are hardly convincing as regards, inter alia, consistency and mouthfeel. Compared to natural cheese, the consistency of the vegan alternatives to cheese is less elastic and rather brittle. Mouthfeel is found to be insufficiently moist and creamy by most consumers. It can therefore be assumed that improving the sensory properties would lead to greater acceptance by consumers.

Vegan alternatives to cheese have the same uses as cheese: they are used as a bread topping/sandwich filling and for gratinating, for example in the case of casseroles and pizzas.

Furthermore, many of the vegan alternatives to cheese are based on food starches, plant fat and binders. High-protein foods are not used at all or only in small amounts, and so the protein content of the vegan alternatives to cheese is very low. A higher protein content is, however, desirable insofar as this might achieve a more balanced and healthier diet.

Especially products having a low plant protein content of usually below 2% have been launched on the market in recent years for nutritional enhancement and sensory improvement of the vegan alternatives to cheese. According to current knowledge, higher protein concentrations are especially difficult to achieve with plant proteins in combination with starch, since a cheese-like consistency cannot be formed thereby. Furthermore, the products were not sliceable, produced a rough mouthfeel, and had a dull appearance not typical of cheese.

It is therefore the object of the present invention to achieve a vegan food product—in particular a vegan alternative to cheese that is to have preferably a sliceable-cheese character—which in terms of its texture, its organoleptic properties and in terms of its nutritional profile resembles a classic cheese produced from milk, and which is notable above all for properties such as good sliceability and is thus suitable as a bread topping/sandwich filling.

Such a food product should also contain few additives or no additives with health risks and have a high protein content.

DESCRIPTION OF THE INVENTION

In a first aspect, the invention provides a vegan food product containing
  (i) about 15% to about 35% by weight of a fat component of plant origin;
  (ii) about 15% to about 35% by weight of modified starch;
  (iii) about 0.5% to about 3% by weight of (table) salt;
  (iv) about 0.1% to about 2% by weight of gelling agent;
  (v) about 0.1% to about 2% by weight of carbohydrates;
  (vi) about 0.1% to about 6% by weight of plant proteins;
  (vii) about 0.1% to about 1.5% by weight of flavourings, seasonings and/or colourings;
  (viii) 0% to about 5% by weight of further food ingredients,
with the proviso that all the quantities total 100% by weight with water.

In a preferred embodiment, the food product according to the invention contains
  (i) about 20% to about 25% by weight of a fat component of plant origin;
  (ii) about 20% to about 25% by weight of modified starch;
  (iii) about 1% to about 1.7% by weight of (table) salt;
  (iv) about 0.2% to about 0.6% by weight of gelling agent;
  (v) about 0.3% to about 0.6% by weight of carbohydrates;
  (vi) about 2% to about 4% by weight of plant proteins;
  (vii) about 0.1% to about 1.5% by weight of flavourings, seasonings and/or colourings;
  (viii) 0% to about 5% by weight of further food ingredients,
with the proviso that all the quantities total 100% by weight with water.

It has surprisingly been found that the food product according to the invention completely fulfils the extensive task described at the start. The specific combination of components i) to viii) leads to a vegan food product, in particular to a vegan alternative to cheese with a sliceable-cheese character, in particular with a sliceable-cheese character of the "young Gouda" type, which in terms of its texture, its organoleptic properties and in terms of its nutritional profile resembles a classic cheese produced from milk, and which is notable above all for its good sliceability and is thus suitable as a bread topping/sandwich filling.

Furthermore, it has surprisingly been found that the brownish colour that typically comes from the protein sources cannot be observed in the vegan food product according to the invention.

Moreover, the food product according to the invention can be supplemented as desired and/or modified as regards taste by the optional addition of further food ingredients (component viii)) and is technically simple to produce.

In a preferred embodiment, the food product according to the invention is a vegan alternative to cheese, preferably a vegan alternative to cheese with a sliceable-cheese character, in particular a vegan alternative to cheese with a sliceable-cheese character of the "young Gouda" type.

All the ingredients of the food product according to the invention, including all optional ingredients, are acceptable to vegans.

As already stated, the food product according to the invention contains a fat component of plant origin.

In the context of the present invention, the fat component is any kind of fat or oil of plant origin that is suitable for human consumption.

In the context of the present invention, fat or oil is a composition containing at least 95% by weight, preferably at least 98% by weight, of di- and triglycerides and is preferably a composition substantially containing only triglycerides, the amount of diglycerides being less than 2% by weight, preferably less than 1% by weight. The difference between a fat and an oil is that a fat is solid at 20° C., whereas an oil is liquid at this temperature. In this connection, "liquid" means that the viscosity is such that the oil can flow, even though it may be a viscous liquid.

In a preferred embodiment, the fat component of plant origin possible as component (i) in the context of the present invention is selected from the group consisting of cocoa butter, coconut oil, palm oil, palm kernel oil, solid coconut oil, nut oil, shea butter, apricot oil, soya lecithin, sunflower oil, soya oil, rapeseed oil or mixtures thereof. In the context of the present invention, the term "nut oil" covers all possible fat components of plant origin that are to be understood as "nut oils" to a person skilled in the art, for example walnut oil, hazelnut oil, almond oil, pistachio oil, cashew oil, pine nut oil, peanut oil or macadamia nut oil. In a further preferred embodiment, the fat component of plant origin is selected from the group consisting of coconut oil, palm oil, palm kernel oil, solid coconut oil, shea butter, sunflower oil, soya oil, rapeseed oil or mixtures thereof.

In a further preferred embodiment, the fat component of plant origin comprises or consists of a mixture of solid coconut oil and shea butter.

It was found that a mixture of solid coconut oil and shea butter is particularly advantageous. The end product, which is not oily, has a fuller flavour and has improved use properties, especially when used as a bread topping/sandwich filling.

In a particularly preferred embodiment, the fat component of plant origin comprises or consists of a mixture of solid coconut oil and shea butter, the weight ratio of solid coconut oil:shea butter being about 90:10, preferably about 80:20, and especially about 70:30.

As already stated, the food product according to the invention contains modified starch.

In the context of the present invention, "modified starches" means starches which have been obtained from native starches by way of physical, enzymatic or chemical processes.

In a particularly preferred embodiment, the modified starches possible as component (ii) in the context of the present invention are selected from the group consisting of modified potato starch, corn starch, rice starch, wheat starch and tapioca starch or mixtures thereof.

It was found that a mixture of at least two different modified starches is particularly advantageous, since the ratio between amylose and amylopectin can be varied as a result. This was found to have a very positive effect, especially as concerns water binding and mouth feeling. Thus, it is possible to "modulate" these properties of the end product, depending on the use of the end product.

In a preferred embodiment, component (ii) is a mixture of three different modified starches, namely starch 1, starch 2 and starch 3.

In a particularly preferred embodiment, component (ii) is a mixture of starch 1, starch 2 and starch 3, the weight ratio of starch 1:starch 2:starch 3 being from about 7:4:1 to about 5.6:3.2:1.

In a further particularly preferred embodiment, component (ii) is a mixture of starch 1, starch 2 and starch 3, the weight ratio of starch 1:starch 2:starch 3 being about 5.6:3.2:1.

As already stated, the food product according to the invention contains a gelling agent.

In a preferred embodiment, the gelling agent possible as component (iv) in the context of the present invention is selected from the group consisting of agar agar (E 406), carrageenan (E 407), gellan gum (E 418), cellulose (E 460), methylcellulose (E 461), sodium alginate (E 401) or mixtures thereof, preferably from the group consisting of carrageenan (E 407), gellan gum (E 418) and sodium alginate (E 401) or mixtures thereof.

It was found that carrageenan is particularly advantageous in respect of consistency and stretch.

Accordingly—in a further particularly preferred embodiment—the gelling agent is carrageenan.

As already stated, the food product according to the invention contains carbohydrates.

In a preferred embodiment, the carbohydrates possible as component (v) in the context of the present invention are selected from the group consisting of allulose, tagatose, cellobiose, xylose, xylulose, ribose, ribulose, sorbose, allose, altrose, arabinose, mannose, gulose, idose, galactose, talose, nigerose, kojibiose, fructose, lactose, dextrose, sucrose, maltodextrin and mixtures thereof, preferably from the group consisting of allulose, xylulose, ribose, arabinose, mannose, galactose, fructose, lactose, dextrose, sucrose, maltodextrin and mixtures thereof.

It was found that dextrose or maltodextrin is particularly advantageous in respect of taste and browning, since there is minimization of the formation of degradation products by means of, for example, caramelization processes or Maillard reactions during use of the end product for example during melting.

Accordingly—in a further particularly preferred embodiment—the carbohydrates are selected from the group consisting of dextrose and maltodextrin and mixtures thereof.

As already stated, the food product according to the invention contains plant proteins.

In a preferred embodiment, the plant proteins possible as component (vi) in the context of the present invention are selected from the group consisting of soya protein, lupin protein, rapeseed protein, pea protein, rice protein, almond protein or a mixture thereof, which have a high protein content in dry matter and have at the same time a low content of dietary fibre; soya protein, lupin protein, rapeseed protein, pea protein and rice protein having a protein content of greater than 80% or almond protein having a protein content of approx. 50% are particularly suitable for example. The proteins can be fermented or unfermented proteins.

As already stated, the food product according to the invention contains flavourings, seasonings and/or colourings (component (vii)).

The nature of these additives is less critical in the context of the invention and is substantially determined by the taste requirements. These additives need only meet the requirement that they be compatible in a vegan food product, in particular in a vegan alternative to cheese. These additives are well-known to a person skilled in the art, and so further details thereof do not need to be given.

The selection of the further food ingredients which may be present as optional component (viii) is not critical and is determined only by intended use, taste or visual impression. These additives are well-known to a person skilled in the art, and so further details thereof do not need to be given.

A further ingredient of the food product according to the invention is water. The water is preferably tap water that is suitable for use in foods. This means that the water must be sufficiently clean and should not contain any excess salts, microorganisms or toxic constituents. In a preferred embodiment, the water is microfiltered water. Water is used in such an amount that all the ingredients of the food product add up to 100% by weight.

In a further aspect, the present invention provides a method for producing the vegan food product according to the invention, comprising or consisting of the following steps:
(a) providing heated water, wherein the water has a temperature ≥30° C. and <60° C.;
(b) adding salt to the water from step (a) while stirring, wherein the temperature is within the range defined in step (a) during the addition and at the end thereof;
(c) adding a gelling agent to the intermediate product of step (b) while stirring, wherein the temperature is within the range defined in step (a) during the addition and at the end thereof;
(d) heating the intermediate product of step (c) to a temperature ≥60° C. and ≤90° C. while stirring;
(e) adding:
at least 2 different modified starches, preferably 3 different modified starches
non-starch carbohydrates and
plant proteins;
to the intermediate product of step (d) while stirring, wherein the temperature is within the range defined in step (d) during the addition and at the end thereof;
(f) adding a fat component of plant origin to the intermediate product of step (e) while stirring, wherein the temperature is within the range defined in step (e) during the addition and at the end thereof;
(g) heating the intermediate product of step (f) to a temperature 60° C. and 100° C. while stirring, though higher than the temperature in steps (d) to (f);
(h) adding flavourings, seasonings and/or colourings and optionally further food ingredients to the intermediate product of step (g) while stirring, wherein the temperature is within the range defined in step (g) during the addition and at the end thereof;
(i) hot-holding the composition of step (h) at the temperature of step (h) for a period of from about 2 minutes to about 10 minutes while stirring;
(j) cooling to a temperature within the range from about 30° C. to about 50° C.;
(k) adding starter cultures and/or rennet to the intermediate product of step (j); and
(l1) carrying out filling of the product obtained in step (k); or
(l2) temporarily storing the product obtained in step (k) in a tank under sterile conditions and carrying out subsequent filling.

It has surprisingly been found only the combination or order of steps (a) to (l1) or (l2) according to the invention together with the selection of the specific ingredients ensures that a vegan food product, in particular a vegan alternative to cheese, having the desired properties is obtained. If the ingredients are used in a different order or if the production conditions are not observed, the desired product is not obtained.

With regard to the different ingredients used in this method, the foregoing statements (cf. paragraphs § 0014]-[0048]) are applicable. Accordingly, what are applicable there are, for example, the foregoing definitions, quantities and weight ratios.

In a preferred embodiment, the water in step (a) has a temperature ≥45° C. and <60° C., preferably a temperature in the range from about 50° C. to about 55° C.

In a further preferred embodiment, the temperature in steps (a) and (b) is the same.

In a further preferred embodiment, the temperature in steps (a) and (c) is the same.

In a particular preferred embodiment, the temperature in steps (a), (b) and (c) is the same. This proved particularly advantageous in respect of the stability of the intermediate product of step (c), since said intermediate product of step (c) is a homogeneous mixture as a result, and phase separation does not occur.

In a preferred embodiment, heating is carried out in step (d) to a temperature ≥60° C. and ≤80° C., preferably to a temperature 60°≥ C. and ≤70° C., especially preferably to a temperature ≥60° C. and ≤65° C.

In a further preferred embodiment, the temperature in steps (d) and (e) is the same; this proved particularly advantageous in respect of the stability of the intermediate product of step (e), since said intermediate product of step (e) is a homogeneous mixture as a result, and phase separation does not occur, but also in respect of the structure of the end product.

In a preferred embodiment, the modified starches, carbohydrates and plant proteins are added simultaneously in step (e).

In a further preferred embodiment, the temperature in steps (d) and (e) is the same, the modified starches, carbohydrates and plant proteins being added simultaneously in step (e).

In a preferred embodiment, the fat component of plant origin (step (f) of the method according to the invention) is added in three stages. This means that the fat component is added not once, but in three portions, each of these portions being the same. A portion is added once a homogenised mixture has formed after the previous portion has been added. This type of addition of the fat component of plant origin proved to be particularly advantageous, especially as concerns the texture of the end product.

In a further preferred embodiment, the temperature in steps (d), (e) and (f) is the same.

It was found that the additional heating step (step (g) of the method) is particularly advantageous. This also proved particularly advantageous in respect of the stability of the intermediate product, since said intermediate product is a homogeneous mixture as a result, and phase separation does not occur, but also in respect of the structure of the end product.

In a preferred embodiment, heating is carried out in step (g) to a temperature 70° C. and 95° C., preferably to a temperature 80° C. and 90° C., especially preferably to a temperature 83° C. and 87° C.

In a particular embodiment, heating is carried out in step (g) to a temperature of about 85° C.

In a further preferred embodiment, the temperature in steps (g) and (h) is the same. This also proved particularly advantageous in respect of the stability of the intermediate product, since said intermediate product is a homogeneous mixture as a result, and phase separation does not occur, but also in respect of the structure of the end product.

Also found to be crucial for the good quality of the end product was the hot-holding of the intermediate product of step (h) at a particular temperature and for a particular period. This also proved particularly advantageous in respect of the stability of the intermediate product, since said intermediate product is a homogeneous mixture as a result, and phase separation does not occur, but also in respect of the structure of the end product.

In a preferred embodiment, flavourings, seasonings and/or colourings and the optional further food ingredients are added simultaneously in step (h).

In a preferred embodiment, the hot-holding in step (i) is carried out for a period of from about 3 minutes to about 8 minutes, especially preferably for a period of from about 4 minutes to about 5 minutes. In the context of the present invention, hot-holding means that the temperature in step (i) is the same as in step (h).

Thereafter, cooling is carried out to a temperature within the range from about 30° C. to about 50° C. (step (j) of the method according to the invention). The aim of this step is to bring the intermediate product to the correct temperature, so that the subsequent fermentation can be carried out optimally.

In a preferred embodiment, cooling is carried out in step (j) to a temperature of from about 35° C. to about 45° C., especially preferably to a temperature of about 40° C.

In a preferred embodiment, starter cultures and/or rennet are added at a temperature of about 40° C.

Thereafter, filling of the product can be carried out directly, meaning that fermentation and maturation takes place in the package (step (11) of the method according to the invention), or the product is temporarily stored in a suitable tank under sterile conditions, and fermentation is followed by filling the package, where maturation takes place (step (12) of the method according to the invention).

It was found that the output when stirring in the various steps of the method according to the invention is of great importance, especially in respect of the consistency and the structure of the end product.

In a preferred embodiment, the speed when stirring in steps (a) to (h) is within the range from about 1800 to about 2400 rpm, preferably from about 2000 to about 2200 rpm, and especially 2100 rpm.

In a further preferred embodiment, the speed when stirring in step (i) is within the range from about 1000 to about 1500 rpm, preferably from about 1200 to about 1400 rpm, and especially 1300 rpm.

The present invention further provides a vegan food product according to paragraphs [0014]-[0015] obtainable or obtained by the method according to paragraphs [0049]-[0075].

The present invention further provides a comestible product comprising a vegan food product as defined in paragraphs [0014]-[0048] or obtainable by the method described in paragraphs [0049]-[0075].

The present invention further provides for the use of the vegan food product as defined in paragraphs [0014]-[0048] or obtainable by the method described in paragraphs [0049]-[0075] as a bread topping/sandwich filling.

EXAMPLES

The present invention will be more readily understood by reference to the following examples.

However, said examples merely serve to illustrate the invention and cannot be interpreted in a limiting manner in relation to the scope of protection of the invention.

Example 1 (According to the Invention)

An example vegan food product according to the present invention was produced, comprising:

TABLE 1

| Ingredient | Amount (% by weight) |
| --- | --- |
| (Table) salt | 1.5 |
| Carrageenan | 0.5 |
| Fat component (solid coconut oil:shea butter; 70:30) | 24 |
| Modified starch 1 | 14.5 |
| Modified starch 2 | 8.0 |
| Modified starch 3 | 2.5 |
| Dextrose | 0.5 |
| Lupin protein (unfermented) | 3 |
| Flavourings, seasonings and colourings | 0.5 |
| Water | to 100% by weight |

The product was produced by the method according to the present invention. The relevant process parameters are summarized in Table 2:

TABLE 2

| Steps of the method | Conditions |
| --- | --- |
| (a) | 50-55° C., 2100 rpm |
| (b) | 50-55° C., 2100 rpm |
| (c) | 50-55° C., 2100 rpm |
| (d) | 60-65° C., 2100 rpm |
| (e) | 60-65° C., 2100 rpm |
| (f) | 60-65° C., 2100 rpm |
| (g) | 85° C., 2100 rpm |
| (h) | 85° C., 2100 rpm |
| (i) | 85° C., 1300 rpm, 4-5 min |
| (j) | 40° C., 1300 rpm |

Filling and cooling of the product were carried out.

The product obtained by the method (=P1) had a consistency resembling the consistency of a sliceable cheese of the "young Gouda" type.

Example 2 (not According to the Invention)

An example vegan food product was produced, comprising:

TABLE 3

| Ingredient | Amount (% by weight) |
| --- | --- |
| (Table) salt | 1.5 |
| Carrageenan | 0.5 |
| Fat component (solid coconut oil:shea butter; 70:30) | 24 |
| Modified starch 1 | 14.5 |
| Modified starch 2 | 8.0 |
| Modified starch 3 | 2.5 |
| Dextrose | 0.5 |

TABLE 3-continued

| Ingredient | Amount (% by weight) |
| --- | --- |
| Lupin protein (unfermented) | 3 |
| Flavourings, seasonings and colourings | 0.5 |
| Water | to 100% by weight |

In this case, the product was produced as follows:

In a first step, water, protein, fat component and the starch were placed into a suitable vessel (e.g. stirrer with heating function). The ingredients were stirred for 1 min and then heated to 95° C., which lasted about 10 min. The heating step was carried out at about 2000-9000 rpm. After a temperature of 95° C. was reached, carrageenan, (table) salt, carbohydrates and the flavourings, seasonings and colourings were added. The entire mass was then homogenized for 2 min with vigorous stirring (8000-12 000 rpm). After homogenization, the mass was filled into suitable portions and cooled.

The product obtained (=V1) had a cheese-like consistency.

Example 3 (not According to the Invention)

An example vegan food product was produced, comprising:

TABLE 4

| Ingredient | Amount (% by weight) |
| --- | --- |
| (Table) salt | 1.5 |
| Carrageenan | 0.5 |
| Fat component (solid coconut oil:shea butter; 70:30) | 24 |
| Native starch | 25 |
| Dextrose | 0.5% |
| Lupin protein (unfermented) | 3 |
| Flavourings, seasonings and colourings | 0.5 |
| Water | to 100% by weight |

The product was produced by the method according to the present invention. The relevant process parameters are summarized in Table 5:

TABLE 5

| Steps of the method | Conditions |
| --- | --- |
| (a) | 50-55° C., 2100 rpm |
| (b) | 50-55° C., 2100 rpm |
| (c) | 50-55° C., 2100 rpm |
| (d) | 60-65° C., 2100 rpm |
| (e) | 60-65° C., 2100 rpm |
| (f) | 60-65° C., 2100 rpm |
| (g) | 85° C., 2100 rpm |
| (h) | 85°C, 2100 rpm |
| (i) | 95° C., 1800 rpm, 12 min |
| (j) | 40° C., 1300 rpm |

Filling and cooling of the product were carried out.

The product obtained by the method (=V2) had a cheese-like consistency.

Evaluation of P1, V1 and V2

After storage, P1, V1 and V2 were evaluated in respect of visual properties (browning), taste properties, consistency and gratinating properties (after use of the products in producing a pizza Margherita) by a panel consisting of five experienced and trained testers. The results are summarized in Table 6.

TABLE 6

| Examples | Taste | Sliceability | Browning |
| --- | --- | --- | --- |
| P1 | 1 | 1 | x |
| V1 | 2 | 3 | x |
| V2 | 3 | 3 | √ |

Rating Scale:

| Taste | 1 to 5, with 1 being the highest rating |
| --- | --- |
| Sliceability | 1 to 5, with 1 being the highest rating |
| Browning | x = not determinable; √ = present |

The experimental data show that P1 (recipe according to the invention and method according to the invention) exhibits improved properties with respect to visual impression, taste and sliceability.

The invention claimed is:

1. A method for producing a vegan food product the method comprising or consisting of the following steps:
(a) heating water to a temperature ≥30° C. and <60° C.;
(b) adding salt to the water from step (a) while stirring, wherein the temperature is within the range defined in step (a) during the addition and at the end thereof;
(c) adding a gelling agent to the intermediate product of step (b) while stirring, wherein the temperature is within the range defined in step (a) during the addition and at the end thereof;
(d) heating the intermediate product of step (c) to a temperature ≥60° C. and ≤90° C. while stirring;
(e) adding:
at least 2 different modified starches
non-starch carbohydrates and
plant proteins;
to the intermediate product of step (d) while stirring, wherein the temperature is within the range defined in step (d) during the addition and at the end thereof;
(f) adding a fat component of plant origin to the intermediate product of step (e) while stirring, wherein the temperature is within the range defined in step (e) during the addition and at the end thereof;
(g) heating the intermediate product of step (f) to a temperature ≥60° C. and ≤100° C. while stirring, though higher than the temperature in steps (d) to (f);
(h) adding at least one flavouring, seasoning and/or colouring and optionally adding at least one further food ingredients to the intermediate product of step (g) while stirring, wherein the temperature is within the range defined in step (g) during the addition and at the end thereof;
(i) hot-holding the composition of step (h) at the temperature of step (h) for a period of from about 2 minutes to about 10 minutes while stirring;
(j) cooling to a temperature within the range from about 30° C. to about 50° C.;
(k) adding starter cultures and/or rennet to the intermediate product of step (j);
and
(l1) carrying out filling of the product obtained in step (k);
or
(l2) temporarily storing the product obtained in step (k) in a tank under sterile conditions and carrying out subsequent filling, wherein the vegan food product comprises
i) about 15% to about 35% by weight of a fat component of plant origin;
ii) about 15% to about 35% by weight of modified starch;
iii) about 0.5% to about 3% by weight of table salt;
iv) about 0.1% to about 2% by weight of gelling agent;
v) about 0.1% to about 2% by weight of carbohydrates;
vi) about 0.1% to about 6% by weight of plant proteins;
vii) about 0.1% to about 1.5% by weight of flavourings, seasonings, and/or colourings;
viii) 0% to about 5% by weight of further food ingredients,
with the proviso that all the quantities total 100% by weight with water.

2. The method according to claim 1, wherein heating is carried out to a temperature ≥60° C. and ≤80° C. in step (d).

3. The method according to claim 1, wherein the temperature in steps (d), (e) and (f) is the same.

4. The method according to according to claim 1, wherein heating is carried out to a temperature ≥70° C. and ≤95° C. in step (g).

5. The method according to claim 1, wherein the temperature in steps (g) and (h) is the same.

6. The method according to claim 1, characterized in that the hot-holding in step (i) is carried out for a period of from about 3 minutes to about 8 minutes.

\* \* \* \* \*